(12) United States Patent
Hwang et al.

(10) Patent No.: US 9,651,116 B2
(45) Date of Patent: May 16, 2017

(54) PLANETARY GEAR TRAIN OF AUTOMATIC TRANSMISSION FOR VEHICLE

(71) Applicant: Hyundai Motor Company, Seoul (KR)

(72) Inventors: Dong Hwan Hwang, Seoul (KR); Sueng Ho Lee, Seoul (KR); Kangsoo Seo, Yongin-si (KR); Chang Wook Lee, Suwon-si (KR); JongSool Park, Hwaseong-si (KR); Hyu Tae Shim, Hwaseong-si (KR); KyeongHun Lee, Seoul (KR); Jae Chang Kook, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/941,453

(22) Filed: Nov. 13, 2015

(65) Prior Publication Data
US 2016/0333981 A1    Nov. 17, 2016

(30) Foreign Application Priority Data
May 13, 2015 (KR) .................. 10-2015-0066914

(51) Int. Cl.
*F16H 3/66* (2006.01)

(52) U.S. Cl.
CPC ....... *F16H 3/66* (2013.01); *F16H 2200/0065* (2013.01); *F16H 2200/2012* (2013.01);
(Continued)

(58) Field of Classification Search
CPC .............. F16H 3/66; F16H 2200/2097; F16H 2200/2046; F16H 2200/0065; F16H 2200/2012
(Continued)

(56) References Cited

U.S. PATENT DOCUMENTS

| 9,322,460 B1 * | 4/2016 | Ji .................... F16H 3/66 |
| 2007/0202982 A1 * | 8/2007 | Gumpoltsberger ....... F16H 3/66 |
| | | 475/275 |

(Continued)

FOREIGN PATENT DOCUMENTS

| DE | 102010063670 A1 * | 6/2012 | ............... F16H 3/66 |
| JP | 2014-500460 A | 1/2014 | |

(Continued)

*Primary Examiner* — Roger Pang
(74) *Attorney, Agent, or Firm* — Morgan, Lewis & Bockius LLP (57) ABSTRACT

A planetary gear train of an automatic transmission may include input shaft, output shaft, first planetary gear set including first to third rotation elements, second planetary gear set including fourth to sixth rotation elements, third planetary gear set including seventh to ninth rotation elements, fourth planetary gear set including tenth to twelfth rotation elements, and six control elements disposed at portions selectively connecting between the rotation elements and between the rotation elements and a transmission housing, wherein the input shaft is directly connected to the fourth rotation element and the eighth rotation element, the output shaft is directly connected to the eleventh rotation element, the tenth rotation element is directly connected to the third rotation element while being selectively connected to the seventh rotation element, the second rotation element is selectively connected to the sixth rotation element, and the first rotation element is directly connected to the transmission housing.

17 Claims, 3 Drawing Sheets

(52) U.S. Cl.
    CPC ............... *F16H 2200/2046* (2013.01); *F16H 2200/2097* (2013.01)

(58) Field of Classification Search
    USPC ........................................ 475/275–291, 330
    See application file for complete search history.

(56) References Cited

U.S. PATENT DOCUMENTS

2009/0215580 A1* 8/2009 Hart ..................... F16H 3/666
                                                                    475/276
2016/0356359 A1* 12/2016 Lee ........................ F16H 3/66
2016/0363190 A1* 12/2016 Kook ..................... F16H 3/66

FOREIGN PATENT DOCUMENTS

| JP | 2014-500461 A | 1/2014 |
| JP | 2015-59578 A | 3/2015 |
| KR | 10-2012-0133578 A | 12/2012 |

* cited by examiner

| SPEED | SHIFT CONTROL ELEMENT | | | | | | GEAR RATIO | INTER-STAGE RATIO | SPAN OF GEAR RATIO |
|---|---|---|---|---|---|---|---|---|---|
| | B1 | B2 | C1 | C2 | C3 | C4 | | | |
| 1ST |  | ● |  |  | ● |  | 5.214 | 1.575 | 9.163 |
| 2ND |  | ● | ● | ● |  |  | 3.310 | 1.486 | |
| 3RD |  | ● | ● | ● |  |  | 2.228 | 1.332 | |
| 4TH |  | ● | ● |  |  | ● | 1.673 | 1.338 | |
| 5TH |  |  | ● |  | ● | ● | 1.250 | 1.250 | |
| 6TH |  |  | ● | ● | ● |  | 1.000 | 1.151 | |
| 7TH |  |  |  | ● | ● | ● | 0.869 | 1.227 | |
| 8TH | ● |  |  | ● | ● |  | 0.708 | 1.244 | |
| 9TH | ● |  |  |  | ● | ● | 0.569 | - | |
| REV | ● | ● |  |  |  | ● | -3.922 | | |

PLANETARY GEAR TRAIN OF AUTOMATIC TRANSMISSION FOR VEHICLE

CROSS-REFERENCE TO RELATED APPLICATION

The present application claims priority to and the benefit of Korean Patent Application No. 10-2015-0066914 filed on May 13, 2015, the entire contents of which is incorporated herein for all purposes by this reference.

BACKGROUND OF THE INVENTION

Field of the Invention

The present invention relates to an automatic transmission for a vehicle. More particularly, the present invention relates to a planetary gear train of an automatic transmission for a vehicle capable of improving power delivery performance and fuel efficiency and securing linearity of an inter-stage part of shift stages by increasing a span of a gear ratio while implementing 9 forward speeds by as small a number of components as possible.

Description of Related Art

A recent rise in oil prices has caused unlimited competition toward improvement of fuel efficiency.

Therefore, research into a technology capable of decreasing weight and improving fuel efficiency through downsizing of an engine has been conducted, and research into a technology capable of securing drivability and fuel efficiency competitiveness through multi-staging of an automatic transmission has been conducted.

However, as the number of shift stages in the automatic transmission is increased, the number of internal components is increased, such that mountability, cost, weight, transfer efficiency, and the like may be deteriorated.

Therefore, it may be important to develop a planetary gear train capable of generating maximum efficiency with a small number of components in order to increase a fuel efficiency improvement effect through the multi-staging.

In this aspect, recently, an 8-speed automatic transmission has been implemented, and research into and development of the planetary gear train capable of implementing shift stages of 8 speeds or more have been actively conducted.

However, recently, in the case of the 8-speed automatic transmission, since a span of a gear ratio is maintained in a range of 6.5 to 7.5, there is a problem that a fuel efficiency improvement effect is not large.

Therefore, in the case in which a span of a gear ratio of the 8-speed automatic transmission is 9.0 or more, linearity of an inter-stage ratio of shift stages may not be secured, such that operation efficiency of the engine and drivability of a vehicle are deteriorated. Therefore, the development of a high-efficiency automatic transmission of 9 speeds or more has been demanded.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a planetary gear train of an automatic transmission for a vehicle capable of improving power delivery performance and fuel efficiency and securing linearity of an inter-stage part of shift stages by increasing a span of a gear ratio while implementing 9 forward speed shift stages and a 1 reverse speed shift stage by as small a number of components as possible.

An exemplary embodiment of the present invention provides a planetary gear train of an automatic transmission for a vehicle, including: an input shaft receiving power of an engine; an output shaft outputting shifted power; a first planetary gear set including first, second, and third rotation elements; a second planetary gear set including fourth, fifth, and sixth rotation elements; a third planetary gear set including seventh, eighth, and ninth rotation elements; a fourth planetary gear set including tenth, eleventh, and twelfth rotation elements; and six control elements disposed at portions selectively connecting between the rotation elements and between the rotation elements and a transmission housing, wherein the input shaft is directly connected to the fourth rotation element and the eighth rotation element, the output shaft is directly connected to the eleventh rotation element, the tenth rotation element is directly connected to the third rotation element while being selectively connected to the seventh rotation element, the second rotation element is selectively connected to the sixth rotation element, the first rotation element is directly connected to the transmission housing, and three of the six control elements are operated to implement 9 forward speed shift stages and at least one reverse shift stage.

The fifth rotation element may be selectively connected to the third rotation element while being selectively connected to the transmission housing, the twelfth rotation element may be selectively connected to the transmission housing, and at least two of the fourth, fifth, and sixth rotation elements of the second planetary gear set may be selectively connected to each other.

The first, second, and third rotation elements of the first planetary gear set may be a sun gear, a planetary carrier, and a ring gear, respectively, the fourth, fifth, and sixth rotation elements of the second planetary gear set may be a sun gear, a planetary carrier, and a ring gear, respectively, the seventh, eighth, and ninth rotation elements of the third planetary gear set may be a sun gear, a planetary carrier, and a ring gear, respectively, and the tenth, eleventh, and twelfth rotation elements of the fourth planetary gear set may be a sun gear, a planetary carrier, and a ring gear, respectively.

The six control elements may include two brakes and four clutches.

According to an exemplary embodiment of the present invention, 9 forward speed shift stages and 1 reverse speed shift stage may be implemented by combining four planetary gear sets formed of simple planetary gear sets with each other using six control elements.

In addition, since a span of a gear ratio of 9.0 or more is secured, operation efficiency of the engine may be maximized.

Further, linearity of an inter-stage ratio of shift stages is secured through high efficiency multi-staging, thereby making it possible to improve drivability such as acceleration before and after a shift, an engine speed rhythm, and the like.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, an exemplary embodiment of the present invention will be described in detail with reference to the accompanying drawings.

However, contents that are not associated with a description will be omitted in order to clearly describe an exemplary embodiment of the present invention, and components that are the same as or are similar to each other will be denoted by the same reference numerals throughout the present specification.

In the following description, terms 'first', 'second', and the like will be used to distinguish components having the same names from each other, and will not necessarily be limited to a sequence thereof.

Figure 1:
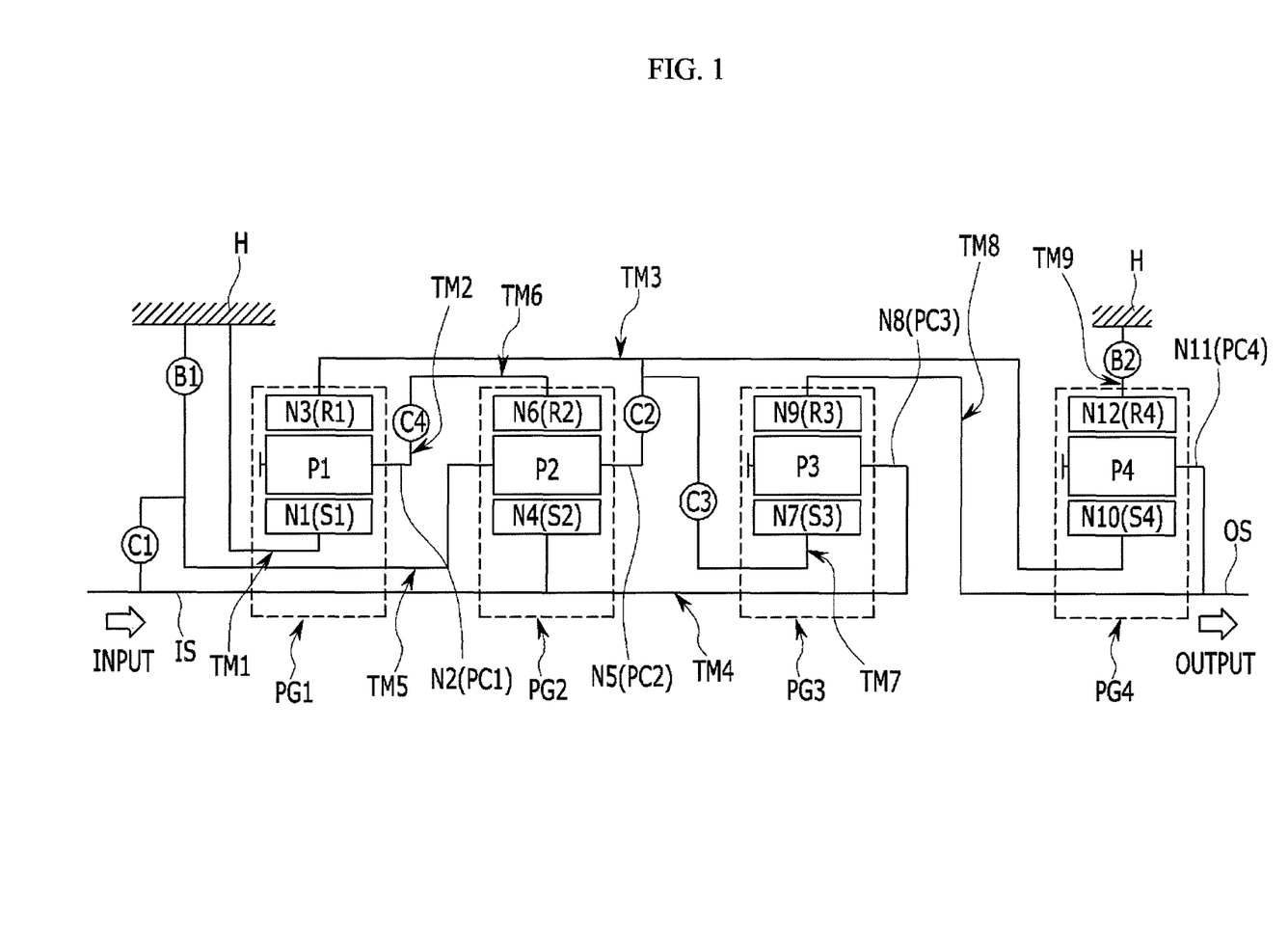
FIG. 1 is a schematic view of a planetary gear train according to an exemplary embodiment of the present invention.

FIG. 1 is a schematic view of a planetary gear train according to a first exemplary embodiment of the present invention.

Referring to FIG. 1, the planetary gear train according to a first exemplary embodiment of the present invention is configured to include first, second, third, and fourth planetary gear sets PG1, PG2, PG3, and PG4 disposed on the same axis, an input shaft IS, an output shaft OS, nine shafts TM1 to TM9 directly connecting the respective rotation elements of the first, second, third, and fourth planetary gear sets PG1, PG2, PG3, and PG4 to each other, six control elements C1 to C4 and B1 and B2, and a transmission housing H.

In addition, rotation power input from the input shaft IS is shifted by mutual complementing operations between the first, second, third, and fourth planetary gear sets PG1, PG2, PG3, and PG4 and is then output through the output shaft OS.

The respective simple planetary gear sets are disposed in a sequence of the first, second, third, and fourth planetary gear sets PG1, PG2, PG3, and PG4 from an engine side.

The input shaft IS is an input member, and rotation power from a crankshaft of an engine is input to the input shaft after a torque thereof is converted through a torque converter.

The output shaft OS, which is an output member, is disposed on the same axis as an axis on which the input shaft IS is disposed, and transfers shifted driving force to a driving shaft through a differential apparatus.

The first planetary gear set PG1, which is a single pinion planetary gear set, includes a first sun gear S1, which is a first rotation element N1, a first planetary carrier PC1, which is a second rotation element N2, supporting a first pinion P1 externally engaged with the first sun gear S1, which is the first rotation element N1, and a first ring gear R1, which is a third rotation element N3, internally engaged with the first pinion P1, as rotation elements.

The second planetary gear set PG2, which is a single pinion planetary gear set, includes a second sun gear S2, which is a fourth rotation element N4, a second planetary carrier PC2, which is a fifth rotation element N5, supporting a second pinion P2 externally engaged with the second sun gear S2, which is the fourth rotation element N4, and a second ring gear R2, which is a sixth rotation element N6, internally engaged with the second pinion P2.

The third planetary gear set PG3, which is a single pinion planetary gear set, includes a third sun gear S3, which is a seventh rotation element N7, a third planetary carrier PC3, which is an eighth rotation element N8, supporting a third pinion P3 externally engaged with the third sun gear S3, which is the seventh rotation element N7, and a third ring gear R3, which is a ninth rotation element N9, internally engaged with the third pinion P3.

The fourth planetary gear set PG4, which is a single pinion planetary gear set, includes a fourth sun gear S4, which is a tenth rotation element N10, a fourth planetary carrier PC4, which is an eleventh rotation element N11, supporting a fourth pinion P4 externally engaged with the fourth sun gear S4, which is the tenth rotation element N10, and a fourth ring gear R4, which is a twelfth rotation element N12, internally engaged with the fourth pinion P4.

In the first, second, third, and fourth planetary gear sets PG1, PG2, PG3, and PG4, the third rotation element N3 is directly connected to the tenth rotation element N10, the fourth rotation element N4 is directly connected to the eighth rotation element N8, and the ninth rotation element N9 is directly connected to the eleventh rotation element N11, such that the first, second, third, and fourth planetary gear sets PG1, PG2, PG3, and PG4 are operated while having a total of nine shafts TM1 to TM9.

Configurations of the nine shafts TM1 to TM9 will be described below.

The first shaft TM1 is configured to include the first rotation element N1 (first sun gear), and is directly connected to the transmission housing H.

The second shaft TM2 is configured to include the second rotation element N2 (first planetary carrier).

The third shaft TM3 is configured to include the third rotation element N3 (first ring gear) and the tenth rotation element N10 (fourth sun gear).

The fourth shaft TM4 is configured to include the fourth rotation element N4 (second sun gear) and the eighth rotation element N8 (third planetary carrier), and is directly connected to the input shaft IS to thereby continuously be operated as an input element.

The fifth shaft TM5 is configured to include the fifth rotation element N5 (second planetary carrier), and is selectively connected to the transmission housing H while being selectively connected to the third shaft TM3 and the fourth shaft TM4.

The sixth shaft TM6 is configured to include the sixth rotation element N6 (second ring gear), and is selectively connected to the second shaft TM2.

The seventh shaft TM7 is configured to include the seventh rotation element N7 (third sun gear), and is selectively connected to the third shaft TM3.

The eighth shaft TM8 is configured to include the ninth rotation element N9 (third ring gear) and the eleventh rotation element N11 (fourth planetary carrier), and is directly connected to the output shaft OS to thereby continuously be operated as an output element.

The ninth shaft TM9 is configured to include the twelfth rotation element N12 (fourth ring gear), and is selectively connected to the transmission housing H.

In addition, four clutches C1 to C4, which are control elements, are disposed at portions of shafts selectively connected to each other among the shafts TM1 to TM9.

In addition, two brakes B1 and B2, which are control elements, are disposed at portions of shafts selectively connected to the transmission housing H among the shafts TM1 to TM9.

Positions of the six control elements C1 to C4 and B1 and B2 will be described below.

The first clutch C1 is disposed between the fourth shaft TM4 and the fifth shaft TM5 to selectively connect the fourth shaft TM4 and the fifth shaft TM5 to each other.

The second clutch C2 is disposed between the third shaft TM3 and the fifth shaft TM5 to selectively connect the third shaft TM3 and the fifth shaft TM5 to each other.

The third clutch C3 is interposed between the third shaft TM3 and the seventh shaft TM7 to selectively connect the third shaft TM3 and the seventh shaft TM7 to each other.

The fourth clutch C4 is interposed between the second shaft TM2 and the sixth shaft TM6 to selectively connect the second shaft TM2 and the sixth shaft TM6 to each other.

The first brake B1 is interposed between the fifth shaft TM5 and the transmission housing H to allow the fifth shaft TM5 to be operated as a selective fixed element.

The second brake B2 is interposed between the ninth shaft TM9 and the transmission housing H to allow the ninth shaft TM9 to be operated as a selective fixed element.

The respective control elements including the first, second, third, and fourth clutches C1, C2, C3, and C4 and the first and second brakes B1 and B2 may be formed of multi-plate type hydraulic pressure friction-coupled units friction-coupled to each other by hydraulic pressure.

Figure 2:
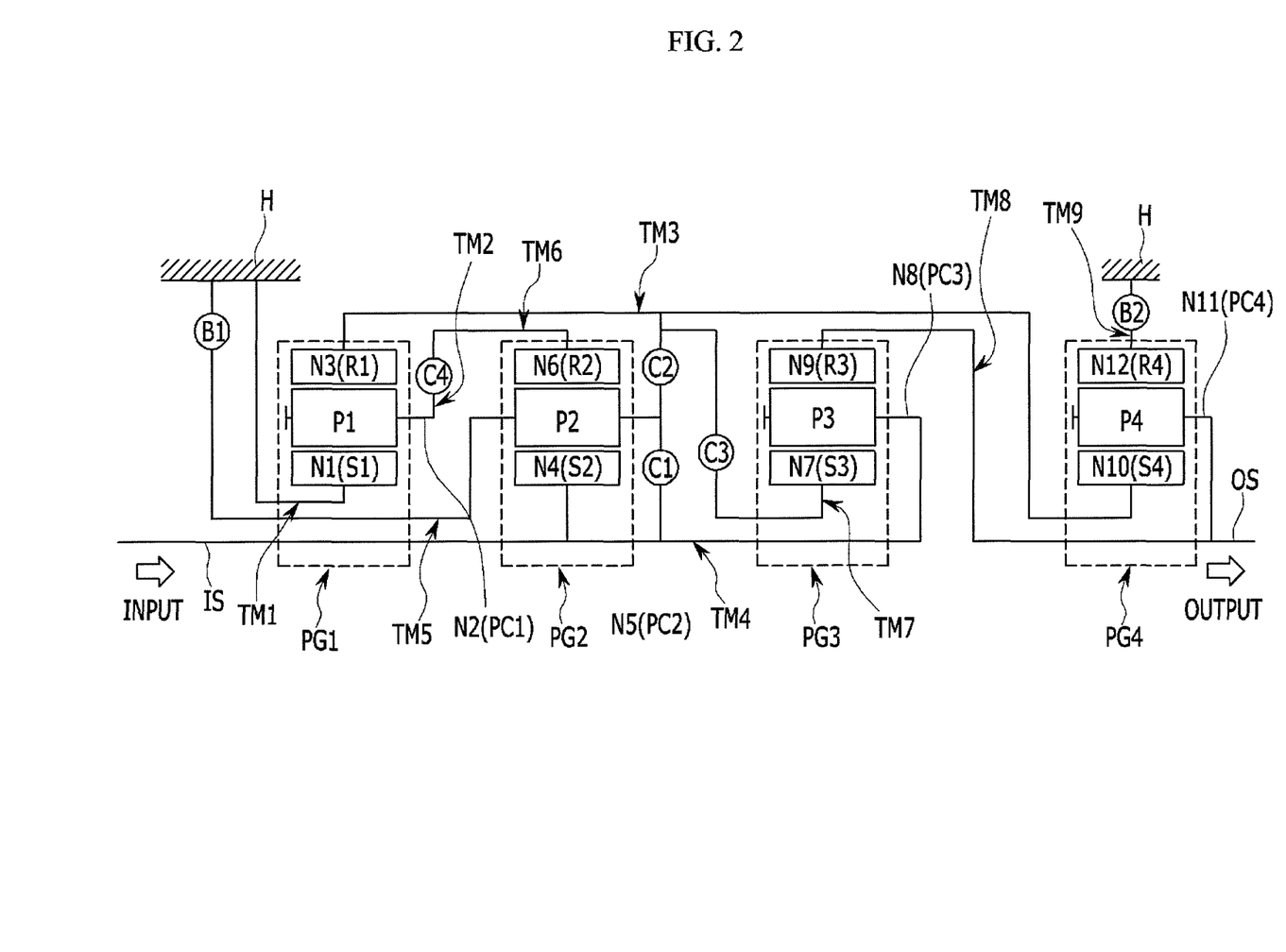
FIG. 2 is a schematic view of a planetary gear train according to an exemplary embodiment of the present invention.

FIG. 2 is a schematic view of a planetary gear train according to a second exemplary embodiment of the present invention.

Referring to FIG. 2, although the first clutch C1 is disposed in front of the first planetary gear set PG1 in the planetary gear train according to a first exemplary embodiment of the present invention, and the first clutch C1 is disposed between the second planetary gear set PG2 and the third planetary gear set PG3 in the planetary gear train according to a second exemplary embodiment of the present invention.

In addition, the planetary gear trains according to first and second exemplary embodiments are different from each other only in a position of the first clutch C1, and are the same as each other in a function of the first clutch C1 selectively connecting the fourth shaft TM4 and the fifth shaft TM5 to each other.

Figure 3:
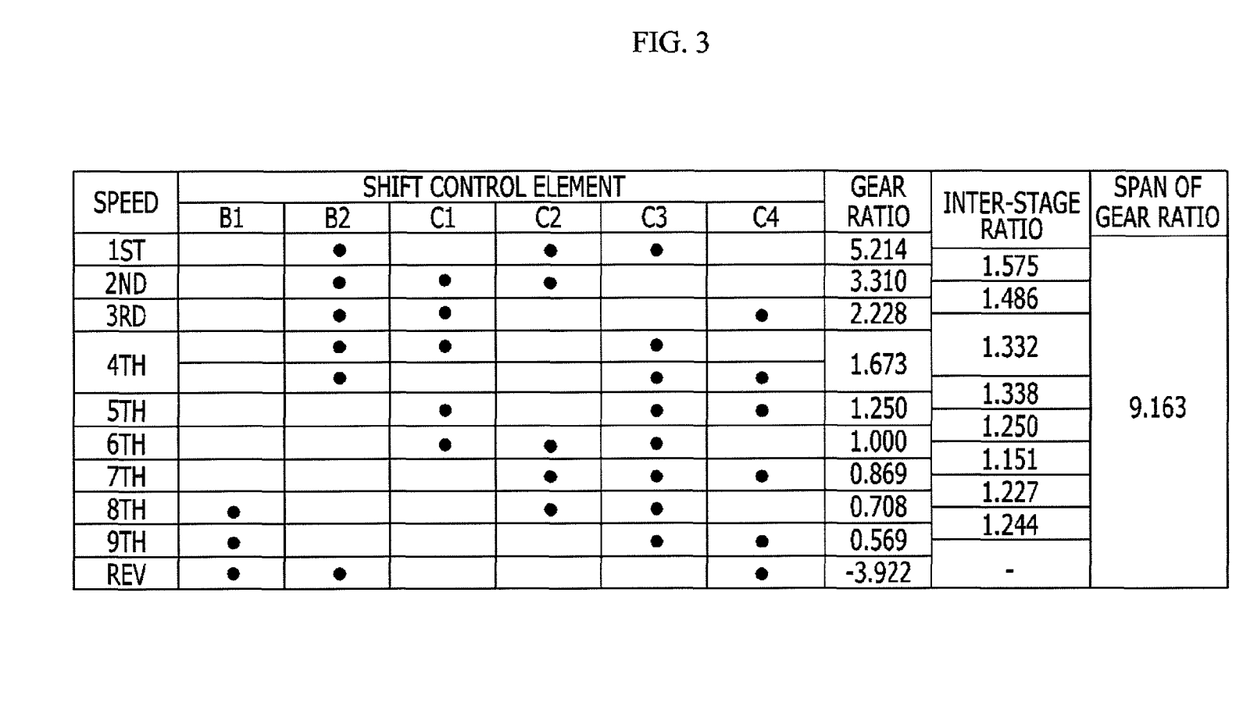
FIG. 3 is an operation table of each shift stage of each control element used in the planetary gear trains according to first and second exemplary embodiments of the present invention.

FIG. 3 is an operation table of each shift stage of each control element used in the planetary gear trains according to first and second exemplary embodiments of the present invention.

As shown in FIG. 3, in the planetary gear trains according to first and second exemplary embodiments of the present invention, a shift is performed while three control elements are operated in each shift stage.

In a 1st forward speed shift stage (1ST), the second and third clutches C2 and C3 and the second brake B2 are simultaneously operated. Therefore, an input is made through the fourth shaft TM4 in a state in which the third shaft TM3 and the fifth shaft TM5 are connected to each other by the operation of the second clutch C2 and the third shaft TM3 and the seventh shaft TM7 are connected to each other by the operation of the third clutch C3, and the ninth shaft TM9 is operated as a fixed element by the operation of the second brake B2, such that a shift to an 1st forward speed is made and an output is made through the eighth shaft TM8.

In a 2nd forward speed shift stage (2ND), the first and second clutches C1 and C2 and the second brake B2 are simultaneously operated. Therefore, an input is made through the fourth shaft TM4 in a state in which the fourth shaft TM4 and the fifth shaft TM5 are connected to each other by the operation of the first clutch C1 and the third shaft TM3 and the fifth shaft TM5 are connected to each other by the operation of the second clutch C2, and the ninth shaft TM9 is operated as a fixed element by the operation of the second brake B2 while the first shaft TM1 is operated as a fixed element, such that a shift to a 2nd forward speed is made and an output is made through the eighth shaft TM8.

In a 3rd forward speed shift stage (3RD), the first and fourth clutches C1 and C4 and the second brake B2 are simultaneously operated. Therefore, an input is made through the fourth shaft TM4 in a state in which the fourth shaft TM4 and the fifth shaft TM5 are connected to each other by the operation of the first clutch C1 and the second shaft TM2 and the sixth shaft TM6 are connected to each other by the operation of the fourth clutch C4, and the ninth shaft TM9 is operated as a fixed element by the operation of the second brake B2 while the first shaft TM1 is operated as a fixed element, such that a shift to a 3rd forward speed is made and an output is made through the eighth shaft TM8.

In a 4th forward speed shift stage (4TH), the first and third clutches C1 and C3 and the second brake B2 are simultaneously operated. Therefore, an input is made through the fourth shaft TM4 in a state in which the fourth shaft TM4 and the fifth shaft TM5 are connected to each other by the operation of the first clutch C1 and the third shaft TM3 and the seventh shaft TM7 are connected to each other by the operation of the third clutch C3, and the ninth shaft TM9 is operated as a fixed element by the operation of the second brake B2 while the first shaft TM1 is operated as a fixed element, such that a shift to a 4th forward speed is made and an output is made through the eighth shaft TM8.

The 4th forward speed shift stage may also be accomplished by control of other control elements.

That is, the third and fourth clutches C3 and C4 and the second brake B2 are simultaneously operated. Therefore, an input is made through the fourth shaft TM4 in a state in which the third shaft TM3 and the seventh shaft TM7 are connected to each other by the operation of the third clutch C3 and the second shaft TM2 and the sixth shaft TM6 are connected to each other by the operation of the fourth clutch C4, and the ninth shaft TM9 is operated as a fixed element by the operation of the second brake B2 while the first shaft TM1 is operated as a fixed element, such that a shift to a 4th forward speed is made and an output is made through the eighth shaft TM8.

In a 5th forward speed shift stage (5TH), the first, third, and fourth clutches C1, C3, and C4 are simultaneously operated. Therefore, an input is made through the fourth shaft TM4 in a state in which the fourth shaft TM4 and the fifth shaft TM5 are connected to each other by the operation of the first clutch C1, the third shaft TM3 and the seventh shaft TM7 are connected to each other by the operation of the third clutch C3, the second shaft TM2 and the sixth shaft TM6 are connected to each other by the operation of the fourth clutch C4, and the first shaft TM1 is operated as a fixed element, such that a shift to a 5th forward speed is made and an output is made through the eighth shaft TM8.

In a 6th forward speed shift stage (6TH), the first, second, and third clutches C1, C2, and C3 are simultaneously operated. Therefore, an input is made through the fourth shaft TM4 in a state in which the fourth shaft TM4 and the fifth shaft TM5 are connected to each other by the operation of the first clutch C1, the third shaft TM3 and the fifth shaft TM5 are connected to each other by the operation of the second clutch C2, the third shaft TM3 and the seventh shaft TM7 are connected to each other by the operation of the third clutch C3, and the first shaft TM1 is operated as a fixed element, such that a shift to a 6th forward speed is made and an output is made through the eighth shaft TM8.

In a 7th forward speed shift stage (7TH), the second, third, and fourth clutches C2, C3, and C4 are simultaneously operated. Therefore, an input is made through the fourth shaft TM4 in a state in which the third shaft TM3 and the fifth shaft TM5 are connected to each other by the operation of the second clutch C2, the third shaft TM3 and the seventh shaft TM7 are connected to each other by the operation of the third clutch C3, the second shaft TM2 and the sixth shaft TM6 are connected to each other by the operation of the fourth clutch C4, and the first shaft TM1 is operated as a fixed element, such that a shift to a 7th forward speed is made and an output is made through the eighth shaft TM8.

In an 8th forward speed shift stage (8TH), the second and third clutches C2 and C3 and the first brake B1 are simultaneously operated. Therefore, an input is made through the fourth shaft TM4 in a state in which the third shaft TM3 and the fifth shaft TM5 are connected to each other by the operation of the second clutch C2 and the third shaft TM3 and the seventh shaft TM7 are connected to each other by the operation of the third clutch C3, and the fifth shaft TM5 is operated as a fixed element by the operation of the first brake B1 while the first shaft TM1 is operated as a fixed element, such that a shift to an 8th forward speed is made and an output is made through the eighth shaft TM8.

In a 9th forward speed shift stage (9TH), the third and fourth clutches C3 and C4 and the first brake B1 are simultaneously operated. Therefore, an input is made through the fourth shaft TM4 in a state in which the third shaft TM3 and the seventh shaft TM7 are connected to each other by the operation of the third clutch C3 and the second shaft TM2 and the sixth shaft TM6 are connected to each other by the operation of the fourth clutch C4, and the fifth shaft TM5 is operated as a fixed element by the operation of the first brake B1 while the first shaft TM1 is operated as a fixed element, such that a shift to a 9th forward speed is made and an output is made through the eighth shaft TM8.

In a reverse shift stage (REV), the fourth clutch C4 and the first and second brakes B1 and B2 are simultaneously operated. Therefore, an input is made through the fourth shaft TM4 in a state in which the second shaft TM2 and the sixth shaft TM6 are connected to each other by the operation of the fourth clutch C4, and the first shaft TM1, the fifth shaft TM5, and the ninth shaft TM9 are operated as fixed elements by the operations of the first and second brakes B1 and B2, such that a reverse shift is made and an output is made through the eighth shaft TM8.

As described above, the planetary gear train according to an exemplary embodiment of the present invention may realize the 9 forward speed shift stages and 1 reverse speed shift stage through the four planetary gear sets PG1, PG2, PG3, and PG4 by controlling the operations of the four clutches C1, C2, C3, and C4 and the two brakes B1 and B2.

In addition, all of inter-stage ratios except for an inter-stage ratio of a 6th/7th forward shift stage are 1.2 or more, and linearity of the inter-stage ratios is secured, thereby making it possible to improve drivability such as acceleration before and after a shift, an engine speed rhythm, and the like.

In addition, since a span of a gear ratio of 9.0 or more is secured, operation efficiency of the engine may be maximized.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A planetary gear train of an automatic transmission for a vehicle, comprising:
   an input shaft receiving power of an engine;
   an output shaft outputting shifted power;
   a first planetary gear set including first, second, and third rotation elements;
   a second planetary gear set including fourth, fifth, and sixth rotation elements;
   a third planetary gear set including seventh, eighth, and ninth rotation elements;
   a fourth planetary gear set including tenth, eleventh, and twelfth rotation elements; and
   six control elements disposed at portions selectively connecting between the rotation elements and between the rotation elements and a transmission housing,
   wherein the input shaft is directly connected to the fourth rotation element and the eighth rotation element,
   wherein the output shaft is directly connected to the eleventh rotation element,
   wherein the tenth rotation element is directly connected to the third rotation element while being selectively connected to the seventh rotation element,
   wherein the second rotation element is selectively connected to the sixth rotation element,
   wherein the first rotation element is directly connected to the transmission housing, and wherein three of the six control elements are operated to implement 9 forward speed shift stages and at least one reverse shift stage.

2. The planetary gear train of the automatic transmission for the vehicle of claim 1, wherein
the fifth rotation element is selectively connected to the third rotation element while being selectively connected to the transmission housing;
the twelfth rotation element is selectively connected to the transmission housing; and
at least two of the fourth, fifth, and sixth rotation elements of the second planetary gear set are selectively connected to each other.

3. The planetary gear train of the automatic transmission for the vehicle of claim 1, wherein
the first, second, and third rotation elements of the first planetary gear set are a sun gear, a planetary carrier, and a ring gear, respectively;
the fourth, fifth, and sixth rotation elements of the second planetary gear set are a sun gear, a planetary carrier, and a ring gear, respectively;
the seventh, eighth, and ninth rotation elements of the third planetary gear set are a sun gear, a planetary carrier, and a ring gear, respectively; and
the tenth, eleventh, and twelfth rotation elements of the fourth planetary gear set are a sun gear, a planetary carrier, and a ring gear, respectively.

4. The planetary gear train of the automatic transmission for the vehicle of claim 1, wherein the six control elements include two brakes and four clutches.

5. A planetary gear train of an automatic transmission for a vehicle, comprising:
an input shaft receiving power of an engine;
an output shaft outputting shifted power;
a first planetary gear set including first, second, and third rotation elements;
a second planetary gear set including fourth, fifth, and sixth rotation elements;
a third planetary gear set including seventh, eighth, and ninth rotation elements;
a fourth planetary gear set including tenth, eleventh, and twelfth rotation elements;
six control elements disposed at portions selectively connecting between the rotation elements and between the rotation elements and a transmission housing;
a first shaft configured to include the first rotation element and directly connected to the transmission housing;
a second shaft configured to include the second rotation element;
a third shaft configured to include the third rotation element and the tenth rotation element;
a fourth shaft configured to include the fourth rotation element and the eighth rotation element and directly connected to the input shaft;
a fifth shaft configured to include the fifth rotation element and selectively connected to the transmission housing while being selectively connected to the third shaft and the fourth shaft;
a sixth shaft configured to include the sixth rotation element and selectively connected to the second shaft;
a seventh shaft configured to include the seventh rotation element and selectively connected to the third shaft;
an eighth shaft configured to include the ninth rotation element and the eleventh rotation element and directly connected to the output shaft to thereby continuously be operated as an output element; and
a ninth shaft configured to include the twelfth rotation element and selectively connected to the transmission housing.

6. The planetary gear train of the automatic transmission for the vehicle of claim 5, wherein
in the first planetary gear set, which is a single pinion planetary gear set, the first rotation element is a first sun gear, the second rotation element is a first planetary carrier, and the third rotation element is a first ring gear;
in the second planetary gear set, which is a single pinion planetary gear set, the fourth rotation element is a second sun gear, the fifth rotation element is a second planetary carrier, and the sixth rotation element is a second ring gear;
in the third planetary gear set, which is a single pinion planetary gear set, the seventh rotation element is a third sun gear, the eighth rotation element is a third planetary carrier, and the ninth rotation element is a third ring gear; and
in the fourth planetary gear set, which is a single pinion planetary gear set, the tenth rotation element is a fourth sun gear, the eleventh rotation element is a fourth planetary carrier, and the twelfth rotation element is a fourth ring gear.

7. The planetary gear train of the automatic transmission for the vehicle of claim 5, wherein the six control elements include:
a first clutch selectively connecting the fourth shaft and the fifth shaft to each other;
a second clutch selectively connecting the third shaft and the fifth shaft to each other;
a third clutch selectively connecting the third shaft and the seventh shaft to each other;
a fourth clutch selectively connecting the second shaft and the sixth shaft to each other;
a first brake selectively connecting the fifth shaft and the transmission housing to each other; and
a second brake selectively connecting the ninth shaft and the transmission housing to each other.

8. The planetary gear train of the automatic transmission for the vehicle of claim 7, wherein the first clutch is disposed in front of the first planetary gear set.

9. The planetary gear train of the automatic transmission for the vehicle of claim 7, wherein the first clutch is disposed between the second planetary gear set and the third planetary gear set.

10. The planetary gear train of the automatic transmission for the vehicle of claim 7, wherein shift stages implemented by selective operations of the six control elements include:
a first forward shift stage implemented by simultaneous operations of the second and third clutches and the second brake;
a second forward shift stage implemented by simultaneous operations of the first and second clutches and the second brake;
a third forward shift stage implemented by simultaneous operations of the first and fourth clutches and the second brake;
a fourth forward shift stage implemented by simultaneous operations of the first and third clutches and the second brake;
a fifth forward shift stage implemented by simultaneous operations of the first, third, and fourth clutches;
a sixth forward shift stage implemented by simultaneous operations of the first, second, and third clutches;
a seventh forward shift stage implemented by simultaneous operations of the second, third, and fourth clutches;

an eighth forward shift stage implemented by simultaneous operations of the second and third clutches and the first brake;
a ninth forward shift stage implemented by simultaneous operations of the third and fourth clutches and the first brake; and
a reverse shift stage implemented by simultaneous operations of the fourth clutch and the first and second brakes.

11. The planetary gear train of the automatic transmission for the vehicle of claim 7, wherein shift stages implemented by selective operations of the six control elements include:
a first forward shift stage implemented by simultaneous operations of the second and third clutches and the second brake;
a second forward shift stage implemented by simultaneous operations of the first and second clutches and the second brake;
a third forward shift stage implemented by simultaneous operations of the first and fourth clutches and the second brake;
a fourth forward shift stage implemented by simultaneous operations of the third and fourth clutches and the second brake;
a fifth forward shift stage implemented by simultaneous operations of the first, third, and fourth clutches;
a sixth forward shift stage implemented by simultaneous operations of the first, second, and third clutches;
a seventh forward shift stage implemented by simultaneous operations of the second, third, and fourth clutches;
an eighth forward shift stage implemented by simultaneous operations of the second and third clutches and the first brake;
a ninth forward shift stage implemented by simultaneous operations of the third and fourth clutches and the first brake; and
a reverse shift stage implemented by simultaneous operations of the fourth clutch and the first and second brakes.

12. A planetary gear train of an automatic transmission for a vehicle, comprising:
an input shaft receiving power of an engine;
an output shaft outputting shifted power;
a first planetary gear set including first, second, and third rotation elements;
a second planetary gear set including fourth, fifth, and sixth rotation elements;
a third planetary gear set including seventh, eighth, and ninth rotation elements;
a fourth planetary gear set including tenth, eleventh, and twelfth rotation elements;
a first shaft configured to include the first rotation element and directly connected to a transmission housing;
a second shaft configured to include the second rotation element;
a third shaft configured to include the third rotation element and the tenth rotation element;
a fourth shaft configured to include the fourth rotation element and the eighth rotation element and directly connected to the input shaft;
a fifth shaft configured to include the fifth rotation element and selectively connected to the transmission housing while being selectively connected to the third shaft and the fourth shaft;
a sixth shaft configured to include the sixth rotation element and selectively connected to the second shaft;
a seventh shaft configured to include the seventh rotation element and selectively connected to the third shaft;
an eighth shaft configured to include the ninth rotation element and the eleventh rotation element and directly connected to the output shaft to thereby continuously be operated as an output element;
a ninth shaft configured to include the twelfth rotation element and selectively connected to the transmission housing;
a first clutch selectively connecting the fourth shaft and the fifth shaft to each other;
a second clutch selectively connecting the third shaft and the fifth shaft to each other;
a third clutch selectively connecting the third shaft and the seventh shaft to each other;
a fourth clutch selectively connecting the second shaft and the sixth shaft to each other;
a first brake selectively connecting the fifth shaft and the transmission housing to each other; and
a second brake selectively connecting the ninth shaft and the transmission housing to each other.

13. The planetary gear train of the automatic transmission for the vehicle of claim 12, wherein
in the first planetary gear set, which is a single pinion planetary gear set, the first rotation element is a first sun gear, the second rotation element is a first planetary carrier, and the third rotation element is a first ring gear;
in the second planetary gear set, which is a single pinion planetary gear set, the fourth rotation element is a second sun gear, the fifth rotation element is a second planetary carrier, and the sixth rotation element is a second ring gear;
in the third planetary gear set, which is a single pinion planetary gear set, the seventh rotation element is a third sun gear, the eighth rotation element is a third planetary carrier, and the ninth rotation element is a third ring gear; and
in the fourth planetary gear set, which is a single pinion planetary gear set, the tenth rotation element is a fourth sun gear, the eleventh rotation element is a fourth planetary carrier, and the twelfth rotation element is a fourth ring gear.

14. The planetary gear train of the automatic transmission for the vehicle of claim 12, wherein the first clutch is disposed in front of the first planetary gear set.

15. The planetary gear train of the automatic transmission for the vehicle of claim 12, wherein the first clutch is disposed between the second planetary gear set and the third planetary gear set.

16. The planetary gear train of the automatic transmission for the vehicle of claim 12, wherein shift stages implemented by selective operations of the first, second, third, and fourth clutches and the first and second brakes include:
a first forward shift stage implemented by simultaneous operations of the second and third clutches and the second brake;
a second forward shift stage implemented by simultaneous operations of the first and second clutches and the second brake;
a third forward shift stage implemented by simultaneous operations of the first and fourth clutches and the second brake;
a fourth forward shift stage implemented by simultaneous operations of the first and third clutches and the second brake;
a fifth forward shift stage implemented by simultaneous operations of the first, third, and fourth clutches;

a sixth forward shift stage implemented by simultaneous operations of the first, second, and third clutches;

a seventh forward shift stage implemented by simultaneous operations of the second, third, and fourth clutches;

an eighth forward shift stage implemented by simultaneous operations of the second and third clutches and the first brake;

a ninth forward shift stage implemented by simultaneous operations of the third and fourth clutches and the first brake; and a reverse shift stage implemented by simultaneous operations of the fourth clutch and the first and second brakes.

17. The planetary gear train of the automatic transmission for the vehicle of claim 12, wherein shift stages implemented by selective operations of the first, second, third, and fourth clutches and the first and second brakes include:

a first forward shift stage implemented by simultaneous operations of the second and third clutches and the second brake;

a second forward shift stage implemented by simultaneous operations of the first and second clutches and the second brake;

a third forward shift stage implemented by simultaneous operations of the first and fourth clutches and the second brake;

a fourth forward shift stage implemented by simultaneous operations of the third and fourth clutches and the second brake;

a fifth forward shift stage implemented by simultaneous operations of the first, third, and fourth clutches;

a sixth forward shift stage implemented by simultaneous operations of the first, second, and third clutches;

a seventh forward shift stage implemented by simultaneous operations of the second, third, and fourth clutches;

an eighth forward shift stage implemented by simultaneous operations of the second and third clutches and the first brake;

a ninth forward shift stage implemented by simultaneous operations of the third and fourth clutches and the first brake; and a reverse shift stage implemented by simultaneous operations of the fourth clutch and the first and second brakes.

* * * * *